(12) United States Patent
Buhl et al.

(10) Patent No.: US 6,748,157 B2
(45) Date of Patent: Jun. 8, 2004

(54) SLED-GUIDE-ASSEMBLY IN PARTICULAR FOR OPTICAL ATTENUATORS

(75) Inventors: Jochen Buhl, Haiterbach (DE); Bernd Nebendahl, Ditzingen (DE); Jörg Schmidt, Moorenweis (DE)

(73) Assignee: Agilent Technologies, Inc., Palo Alto, CA (US)

( * ) Notice: Subject to any disclaimer, the term of this patent is extended or adjusted under 35 U.S.C. 154(b) by 9 days.

(21) Appl. No.: 10/195,600

(22) Filed: Jul. 11, 2002

(65) Prior Publication Data

US 2004/0008966 A1 Jan. 15, 2004

(51) Int. Cl.$^7$ .................................................. G02B 6/00
(52) U.S. Cl. ....................................................... 385/140
(58) Field of Search ................................. 385/135–137, 385/140

(56) References Cited

U.S. PATENT DOCUMENTS

| | | | |
|---|---|---|---|
| 6,614,983 B2 * | 9/2003 | Wu et al. ................... | 385/140 |
| 2003/0081927 A1 * | 5/2003 | Wang et al. ................ | 385/140 |

\* cited by examiner

Primary Examiner—Hemang Sanghavi

(57) ABSTRACT

This invention relates to a sled-guide-assembly, in particular for an optical attenuating device, comprising a straight guidance and a sled, which is movable within the guidance, wherein the guidance has an inner contour, comprising two guide rails, extending parallel to each other, the inner contour comprises a receiving space between the guide rails, the sled comprises an outer contour arranged in the receiving space, and supports an object, in particular an optical attenuating element, outside of the receiving space, the outer contour comprises first edges and second edges, the first edges rest against the guide rails at a first side, which is turned to the object, and overlap this first side transversally to the longitudinal direction of the guide rails, the second edges rest against the guide rails at a second side, which is turn away from the object, and overlap this second side transversally to the longitudinal direction of the guide rails, the second edges are flexible and abut with tension against the guide rails.

17 Claims, 3 Drawing Sheets

SLED-GUIDE-ASSEMBLY IN PARTICULAR FOR OPTICAL ATTENUATORS

BACKGROUND OF THE INVENTION

This invention relates to a sled-guide-assembly, in particular of an optical attenuating device. This invention also relates to a sled for such a sled-guide-assembly.

Optical attenuating devices are used for attenuating optical signals, e.g. for measurement, test, calibration or adjustment purposes. The optical attenuating device generally comprises an optical attenuating element arranged in the light-path of the optical signal. An attenuator with variable attenuation is disclosed e.g. in EP-A-55742, wherein attenuation effect depends of the position of a movable attenuating element with respect to the light-path.

SUMMARY OF THE INVENTION

It is an object of the present invention to provide an improved variable optical attenuator. The object is solved by the independent claims. Preferred embodiments are shown by the dependent claims.

According to the design of such an optical attenuating element, the attenuating effect depends of the longitudinal position of the attenuating element with respect to the light-path. In an optical attenuating device according to the invention, a sled-guide-assembly is used for positioning the optical attenuating element with respect to the light-path. The sled-guide-assembly preferably comprises a guidance extending transversally to the light-path, and a sled, which is movable along the guidance. The sled supports the optical attenuating element. To achieve good measurement results, the optical attenuating element and therefore the sled in the guidance can be positioned preferably with very high precision.

In one embodiment, the optical attenuating element is made of a first material, e.g. glass, the sled is manufactured of a second material, e.g. a synthetic or plastic material, and the guidance is made of a third material, e.g. aluminum or aluminum alloy. The sled-guide-assembly may be provided for use in a wide range of temperatures. The different materials of sled, optical attenuating element and guidance have usually different coefficients of thermal expansion. Therefore, varying temperatures may lead to thermal stress deforming the sled. Deformation of the sled, however, may increase friction and may end in clamping or squeezing between sled and guidance.

According to the invention, the sled is provided with first and second edges overlapping guide rails of the guidance transversally with respect to the longitudinal direction of the guide rails. The first or the second edges are formed flexible or spring elastic and are arranged in such a way abutting with bias or prestress against the guide rails. Biasing or stressing the respective edges against the guide rails leads— on the one hand—to compensation of play or clearances provided in the direction of the bias or stress between the edges and the guide rails and therefore between the sled and the guidance. Relative movements between sled and guidance according to clearances are thus reduced or eliminated in stress direction. On the other hand biasing or stressing compensates relative movements between the edges and the guide rails as result of thermal deformation of the sled. Therefore, high precision positioning of the sled relative to the guidance can be provided. In a preferred use of the sled-guide-assembly guide assembly in an optical attenuator, high precision positioning of the optical attenuating element relative to the light-path can be provided. Also, high precision positioning of the sled can be enabled over a wide range of temperatures.

In a preferred embodiment the sled is divided in its longitudinal direction into a leading sled part and a trailing sled part both fixed independently of each other to the object, which is supported by the sled. Dividing the sled allows de-coupling thermal expansion of the object from thermal expansion of the sled. Thus, thermal deformations of the sled can be reduced or even eliminated. In combination with the biased or stressed abutment between sled and guidance, positioning with very high precision can be achieved.

In another embodiment, the sled parts are coupled to each other via common second edges, wherein this second edges are the flexible ones. This allows simplifying manufacturing of the sled.

In a further embodiment, the flexible edges are formed in a way that they abut point-shaped or line-shaped against the guide rails. The other edges abut plane-shaped against the guide rails. Thus, the functions of the edges can be strictly separated. The flexible edges are provided for stressing or biasing the edges against the guide rails and the other edges are provided for guiding or gliding the sled along the guidance. Therefore friction between sled and guidance is reduced and alignment between sled and guidance is improved.

In another preferred embodiment, each common second edge is provided with a curvature, which is convex to the respective guide rail, extends in the longitudinal direction of the sled substantially over the entire length of the respective second edge and abuts with tension against the respective guide rail, preferably in the middle of the respective edge with respect to the longitudinal direction of the sled. The elasticity of the material of the edges is used to form a spring-like flexibility of the edges.

BRIEF DESCRIPTION OF THE DRAWINGS

Other objects and many of the attendant advantages of the present invention will be readily appreciated and become better understood by reference to the following detailed description when considered in connection with the accompanying drawings. Features that are substantially or functionally equal or similar will be referred to with the same reference sign(s).

FIGS. 4 to 6 depict enlarged views of different transversal sections of the assembly according to cutting lines IV to VI in FIG. 3.

FIGS. 4a to 6a depict enlarged details of FIGS. 4 to 6.

DETAILED DESCRIPTION OF THE INVENTION

Figure 1:
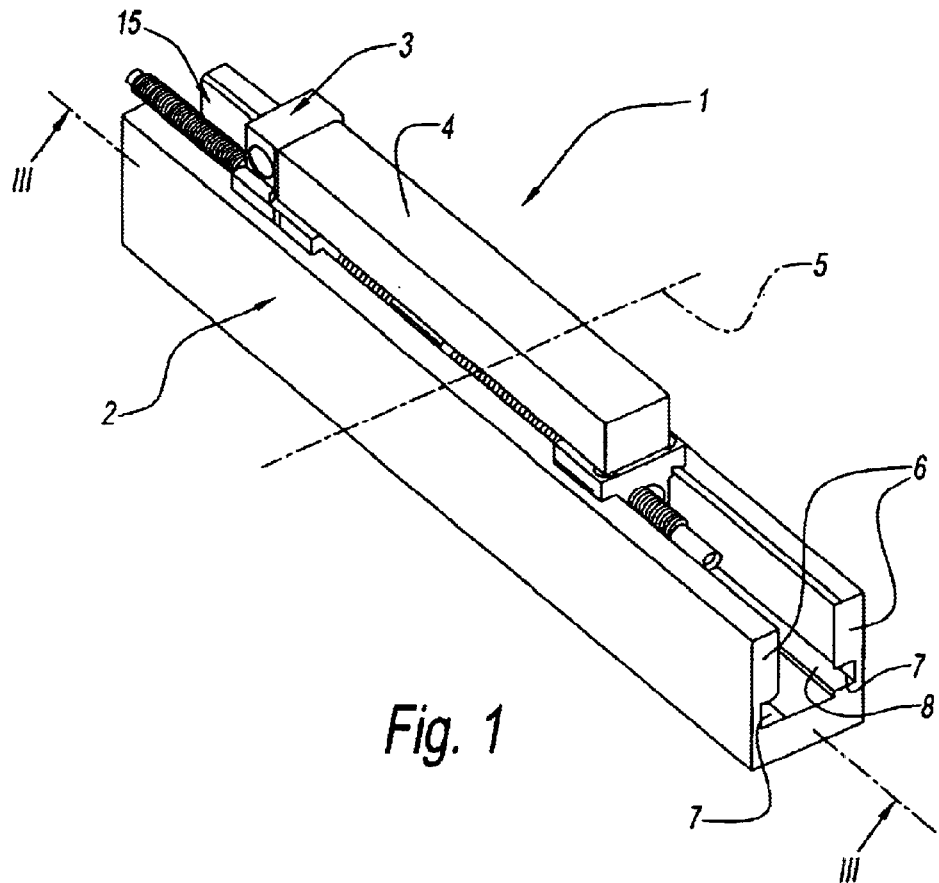
FIGS. 1 and 2 depict isometric views of a sled-guide-assembly according to the invention.

Referring to FIG. 1, a sled-guide-assembly 1 according to the invention comprises a guidance 2 and a sled 3 supporting an object 4. For a preferred use of the sled-guide-assembly guide-assembly 1 the object 4 is an optical attenuating element of an optical attenuating device or attenuator not shown. In such an optical attenuator or attenuating device the sled-guide-assembly 1 is used for positioning the optical attenuating element 4 with respect to a light-path 5 symbolized with a broken line. According to the relative position between optical attenuating element 4 and light-path an optical signal, i.e. a ray of light, is more or less attenuated by passing through the attenuating element 4.

The guidance 2 is provided with an inner contour 15 having two guide rails 6, which extend parallel to each other and define the longitudinal or guiding direction of the guidance 2. In this embodiment the guidance 2 shows a U-shaped profile, wherein its parallel walls form the guide rails 6. At the bottom of the profile are formed transversal recesses 7 providing an undercut for the guide rails 6. The guide rails 6 are arranged to provide a receiving space 8 between each other.

Figure 2:
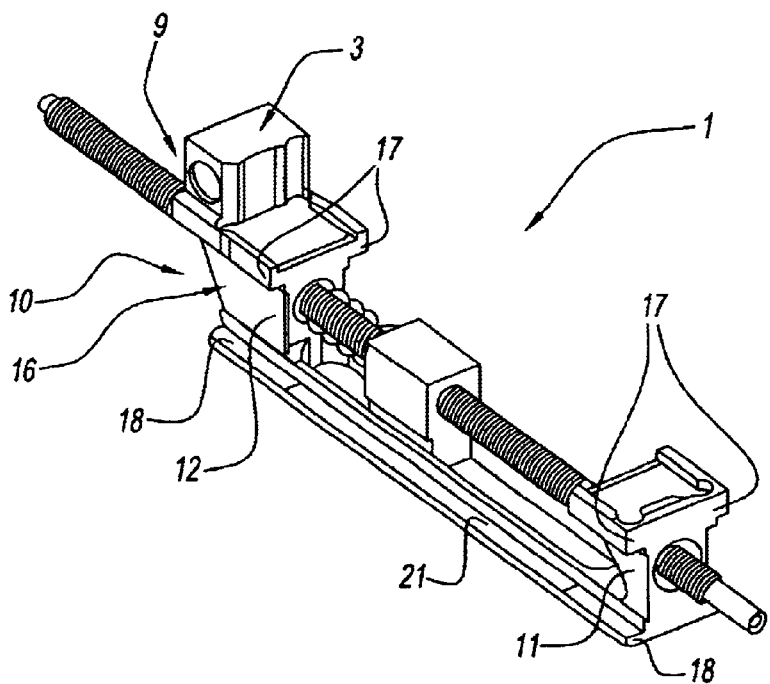

In FIG. 2 the guidance 2 and the object 4 or the optical attenuating element 4 are not shown.

Figure 3:
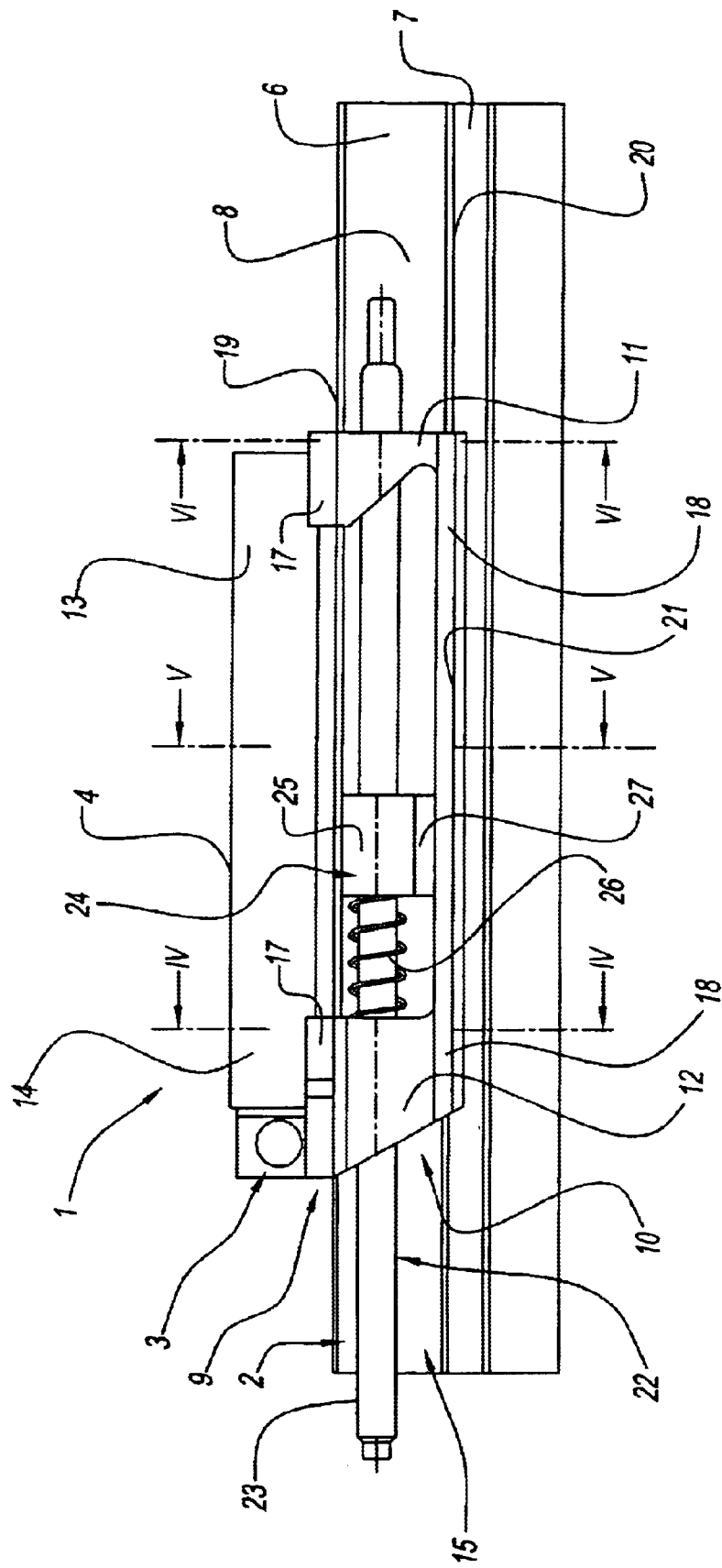
FIG. 3 depicts a longitudinal section of the assembly according to cutting line III in FIG. 1.
Figures 6, 6A:
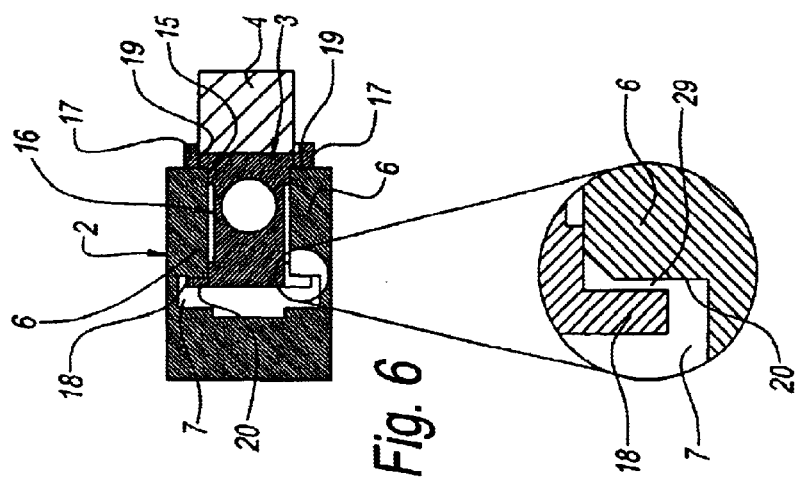
Figures 5, 5A:
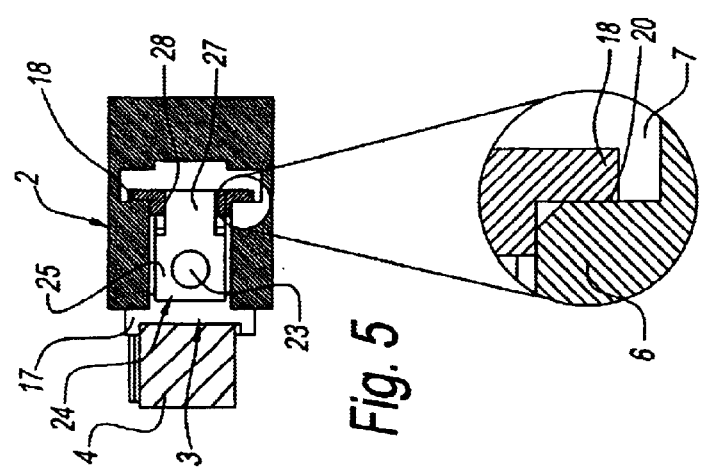
Figures 4, 4A:
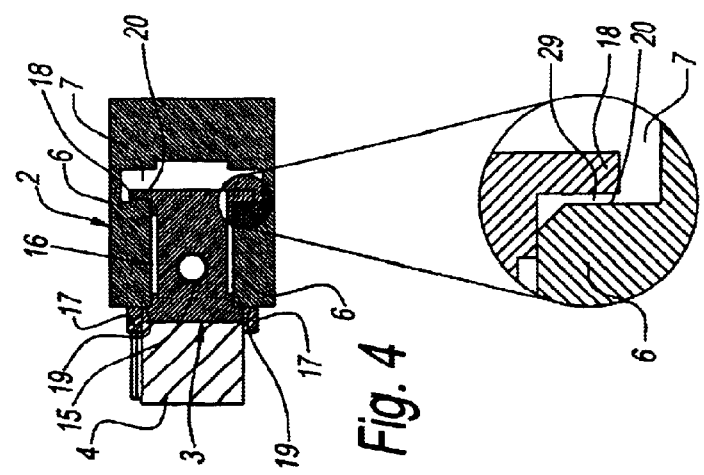

Referring to FIGS. 2 and 3 the sled 3 is divided into a supporting part 9 and a sliding part 10. As the sled 3 is inserted in guidance 2, the sliding part 10 is arranged in the receiving space 8 and the supporting part 9, which supports the object 4, is arranged outside of the receiving space 8. Therefore the object 4 is also arranged outside of the receiving space 8. The sled 3 is further divided into a leading part 11 and a trailing part 12. The object 4 is at its leading end 13 and at its trailing end 14 separately fixed, in particular glued, to the leading part 11 and to the trailing part 12, respectively. Therefore different thermal expansions of object 4 and sled 3 cannot lead to essential thermal stress or deformation at the supporting part 9 of the sled 3.

Referring to FIGS. 4 to 6 and 4a to 6a the sled 3 is provided with an outer contour 16, which is essentially adapted at the inner contour 15 of the guidance 2, i.e. the outer contour 16 is essentially complementary to the inner contour 15. Therefore the outer contour 16 is provided with first edges 17 and with second edges 18. These edges 17, 18 extend laterally and overlap the guide rails 6 transversally to their longitudinal direction. The first edges 17 are provided at a first side 19 of the sled 3, which first side 19 is turned to the object 4. Accordingly the second edges 18 are provided at a second side 20 of the sled 3, which second side 20 is turned away from the object 4. The second edges 18 are engaging the recesses 7. As the edges 17 and 18 overlap the guide rails 6 at the first side 19 and at the second side 20 they provide a closing-shape laterally locking or securing the sled 3 in the guidance 2.

The first edges 17 of the leading part -11 are not directly connected with the first edges 17 of the trailing part 12. An indirect connection is established by the object 4. The first edges 17 are provided with plane-shaped contact zones contacting the guide rails 6 at the first sides 19. Therefore the first edges 17 abut plane-shapedly against the first side 19 of the guide rails 6.

In contrast thereto, the leading part 11 and the trailing part 12 are directly connected by the second edges 18. Therefore the second edges 18 are formed as common edges of both parts, the leading part 11 and the trailing part 12. Referring to FIGS. 2 and 3 each common second edge 18 is provided with a curvature 21, which is convex-shaped relative to the respective guide rail 6. Therefore the curvature 21 provides line-shaped or point-shaped contact zones contacting the respective guide rail 6 at the second side 20, i.e. the second edges 18 abut point—or line-shapedly against the second side 20 of the guide rails 6. The contact between the second edges 18 and the guide rails 6 is preferably realized in the middle of the second edge 18 with respect to the longitudinal direction of the guidance 2.

The shape of the curvatures 21 is also visible in the sections of FIGS. 4 and 4a to 6 and 6a. The section of FIGS. 5 and 5a passes through the line-shaped contact zone of the curvatures 21. Consequently the curvatures 21 or the second edges 18, respectively, abut against the guide rails 6. In contrast thereto the sections of the FIGS. 4, 4a and 6, 6a are passing through the sled 3 before and behind said contact zone. Consequently there is a gap 29 between the second edges 18 an the guide rails 6.

In the depicted preferred embodiment the curvature 21 extends essentially over the whole length of the respective second edge 18. In another embodiment not shown the second edges 18 may be provided with convex-shaped projections instead of the curvatures 21. This projections extend only along a limited length of the respective second edge 18.

As the second edges 18 connect the leading part 11 with the trailing part 12 the second edges 18 are comparatively long and thin. Therefore and according to the material, which is used for forming and/or manufacturing the sled 3, the elasticity of the edge material, e.g. a suitable synthetic or plastic material, provides a flexibility for the second edges 18. Therefore the second edges 18 form or create spring elements. The dimensions of the inner contour 15 of the guidance 2, the outer contour 16 of the sled 3 and the flexible edges 18 are adapted to provide a biased or prestressed abutment of the second edges 18 against the guide rails 6. As the curvatures 21 are symmetrically shaped and contact the guide rails 6 with centrally arranged summits the resulting biasing or stressing or spring forces are symmetrically arranged and reduce friction. In contrast to the second edges 18 the first edges 17 are comparatively rigid or inflexible.

The sled 3 and the sled-guide-assembly 1 work as follows:

Varying temperatures may lead to different thermal expansions of sled 3, guidance 2 and object 4. As the sled 3 is divided into its separated parts 11 and 12 thermal deformation can only occur in the second edges 18. As the second edges 18 are flexible they can compensate this deformation and ensure that the second edges 18 always abut with sufficient bias or stress against the guide rails 6 to avoid relative movements between the first edges 17 and the guide rails 6 and therefore between the object 4 and the guidance 2. The positioning of the sledge 3 with respect to the guidance 2 can therefore be performed with very high precision.

For moving the sled 3 relative to the guidance 2 there may be provided a positioning device 22 with a spindle 23 cooperating with a thread of the sled 3, which is provided at the inside of the trailing part 12 and therefore not visible. A not shown rotary drive is connected with the spindle 23. Rotations of the spindle 23 effect bidirectional movement of sled 3 relative to guidance 2. The positioning device 22 also comprises a biasing arrangement 24 with an abutment element 25, which is arranged on the spindle 23 between the leading part 11 and the trailing part 12. At the invisible inside of the abutment element 25 there is also provided a thread for cooperating with the spindle 23. A coil spring 26 is coaxially arranged on the spindle 23 between the abutment element 25 and the trailing part 12, and provides a biased or stressed abutment of the abutment element 25 against the trailing part 12. Therefore the biasing arrangement 24 compensates play between the spindle 23 and the thread of the trailing part 12. The abutment element 25 comprises a projection 27, which projects into a distance 28 between the second edges 18 of the sled 3 to prevent rotation of the abutment element 25 see also FIG. 5).

What is claimed is:

1. Sled-guide-assembly, in particular for an optical attenuating device, comprising a straight guidance and a sled, which is guidedly and bidirectionally movable within the guidance, wherein
the guidance has an inner contour, comprising at least two guide rails,
the guide rails extend parallel to each other,
the inner contour comprises a receiving space between the guide rails,
the sled comprises an outer contour arranged in the receiving space,
the sled supports an object, in particular an optical attenuating element, outside of the receiving space,
the outer contour comprises first edges and second edges,
the first edges rest against the guide rails at a first side, which is turned to the object, and overlap this first side transversally to the longitudinal direction of the guide rails,
the second edges rest against the guide rails at a second side, which is turned away from the object, and overlap this second side transversally to the longitudinal direction of the guide rails,
the first edges or the second edges are flexible and abut with tension against the guide rails.

2. Sled-guide-assembly according to claim 1, wherein the sled is divided in its longitudinal direction into a leading sled part and a trailing sled part both fixed to the object independently of each other.

3. Sled-guide-assembly according to claim 1, wherein the sled is divided in its longitudinal direction into a leading sled part and a trailing sled part both fixed to the object independently of each other, wherein the sled parts are connected with each other via common second edges, wherein this second edges are the flexible ones.

4. Sled-guide-assembly according to claim 1, wherein each flexible edge comprises at least one curved projection, which is convex to the respective guide rail, wherein this edge abuts with tension against the guide rail via its projection.

5. Sled-guide-assembly according to claim 1, wherein the flexible edges abut point—or line-shaped against the guide rails, wherein the other edges abut plane-shaped against the guide rails.

6. Sled-guide-assembly according to claim 1, wherein the sled is formed as a single part synthetic member and/or die casting member.

7. Sled-guide-assembly according to claim 1, wherein the second edges are the flexible ones.

8. Sled-guide-assembly according to claim 1, wherein
the sled is divided in its longitudinal direction into a leading sled part and a trailing sled part both fixed to the object independently of each other,
the sled parts are connected with each other via common second edges,
this second edges are the flexible ones,
each common second edge has a curvature, which is convex to the respective guide rail,
this curvature extends in the longitudinal direction of the sled essentially over the whole length of the respective second edge,
the curvature abuts with tension against the respective guide rail essentially in the middle of the respective edge with respect to the longitudinal direction of the sled.

9. Sled for a sled-guide-assembly, in particular of an optical attenuating device, wherein
the sled comprises an outer contour, which is insertable in a receiving space,
the receiving space is formed between two guide rails of an inner contour,
the guide rails extend parallel to each other,
the inner contour is formed at a guidance of the sled-guide-assembly,
the sled supports outside of the receiving space an object, in particular an optical attenuating element,
the inner contour comprises a receiving space between the guide rails,
the outer contour comprises first edges and second edges,
the first edges rest against the guide rails at a first side, which is turned to the object, and overlap this first side transversally to the longitudinal direction of the guide rails,
the second edges rest against the guide rails at a second side, which is turned away from the object, and overlap this second side transversally to the longitudinal direction of the guide rails,
the first edges or the second edges are flexible and abut with tension against the guide rails.

10. Sled according to claim 9, wherein
the sled is divided in its longitudinal direction into a leading sled part and a trailing sled part both fixed to the object independently of each other.

11. Sled according to claim 9, wherein
the sled is divided in its longitudinal direction into a leading sled part and a trailing sled part both fixed to the object independently of each other, wherein
the sled parts are connected with each other via common second edges, wherein this second edges are the flexible ones.

12. Sled according to claim 9, wherein
each flexible edge comprises at least one curved projection, which is convex to the respective guide rail, wherein this edge abuts with tension against the guide rail via its projection.

13. Sled according to claim 9, wherein
the flexible edges abut point
or line-shaped against the guide rails, wherein the other edges abut plane-shaped against the guide rails.

14. Sled according to claim 9, wherein
the sled is formed as a single part synthetic member and/or die casting member.

15. Sled according to claim 9, wherein
the second edges are the flexible ones.

16. Sled according to claim 9, wherein
the sled is divided in its longitudinal direction into a leading sled part and a trailing sled part both fixed to the object independently of each other,
the sled parts are connected with each other via common second edges,
this second edges are the flexible ones,
each common second edge has a curvature, which is convex to the respective guide rail,
this curvature extends in the longitudinal direction of the sled essentially over the whole length of the respective second edge,
the curvature abuts with tension against the respective guide rail essentially in the middle of the respective edge with respect to the longitudinal direction of the sled.

17. Optical attenuator comprising a sled-guide-assembly, wherein
- the sled-guide-assembly comprises a straight guidance and a sled, which is guidedly and bidirectionally movable within the guidance,
- the guidance has an inner contour, comprising at least two guide rails,
- the guide rails extend parallel to each other,
- the inner contour comprises a receiving space between the guide rails,
- the sled comprises an outer contour arranged in the receiving space,
- the sled supports an object, in particular an optical attenuating element, outside of the receiving space,
- the outer contour comprises first edges and second edges,
- the first edges rest against the guide rails at a first side, which is turned to the object, and overlap this first side transversally to the longitudinal direction of the guide rails,
- the second edges rest against the guide rails at a second side, which is turned away from the object, and overlap this second side transversally to the longitudinal direction of the guide rails,
- the first edges or the second edges are flexible and abut with tension against the guide rails.

* * * * *